US009001669B2

(12) United States Patent
Vasseur et al.

(10) Patent No.: US 9,001,669 B2
(45) Date of Patent: Apr. 7, 2015

(54) REMOTE STITCHED DIRECTED ACYCLIC GRAPHS

(75) Inventors: Jean-Philippe Vasseur, Saint Martin d'Uriage (FR); Shmuel Shaffer, Palo Alto, CA (US); Sandeep Jay Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 701 days.

(21) Appl. No.: 13/043,111

(22) Filed: Mar. 8, 2011

(65) Prior Publication Data

US 2012/0230204 A1 Sep. 13, 2012

(51) Int. Cl.
H04J 3/14 (2006.01)
H04W 40/22 (2009.01)
H04L 29/08 (2006.01)
H04L 12/26 (2006.01)
H04L 12/707 (2013.01)
H04L 12/753 (2013.01)

(52) U.S. Cl.
CPC ............... *H04W 40/22* (2013.01); *H04L 67/12* (2013.01); *H04L 43/0823* (2013.01); *H04L 43/16* (2013.01); *H04L 45/24* (2013.01); *H04L 45/48* (2013.01); *Y04S 40/168* (2013.01)

(58) Field of Classification Search
None
See application file for complete search history.

(56) References Cited

U.S. PATENT DOCUMENTS 7,512,063 B2 * 3/2009 Vasseur et al. ............... 370/217
7,747,727 B2 6/2010 Friedman et al.
7,801,137 B2 * 9/2010 Vasseur et al. ............... 370/390
7,835,406 B2 11/2010 Oran et al.
2006/0168192 A1 7/2006 Sharma et al.
2008/0273474 A1 * 11/2008 Yanagihara ................... 370/256
2009/0161583 A1 6/2009 Boers et al.
2009/0172689 A1 * 7/2009 Bobak et al. .................. 718/104
2010/0208733 A1 * 8/2010 Zhao et al. .................... 370/390

OTHER PUBLICATIONS

Routing Metrics used for Path Calculation in Low Power and Lossy Networks, JP Vasseur et al., Feb. 22, 2011.*
Title: Routing Metrics used for Path Calculation in Low Power and Lossy draft-ietf-roll-routing-metrics-18 Author: Vasseur et al. Date: Feb. 22, 2011.*
Routing Metrics used for Path Calculation in Low Power and Lossy Networks, Author: JP Vasseur, Feb. 22, 2011.*

(Continued)

*Primary Examiner* — Andrew Lai
*Assistant Examiner* — Leon Andrews
(74) *Attorney, Agent, or Firm* — Parker Ibrahim & Berg LLC; James M. Behmke; Kenneth J. Heywood

(57) ABSTRACT

In one embodiment, in response to a trigger condition being detected at a particular location in a primary directed acyclic graph (DAG) in a computer network, a particular node in the primary DAG at the particular location may be determined to act as a remote stitched (RS)-DAG root for an RS-DAG at the particular location. The determined RS-DAG root may then be instructed to initiate the RS-DAG, the instructing indicating one or more properties for the RS-DAG that are based on the trigger condition and that are different from properties of the primary DAG. In another embodiment, a particular node receives instructions to initiate an RS-DAG as its RS-DAG root, initiates the RS-DAG, and relays messages of the RS-DAG with a primary root of the primary DAG.

29 Claims, 9 Drawing Sheets

(56) References Cited

OTHER PUBLICATIONS

Engmann, S. "PCT Notification of Transmittal of the International Search Report and The Written Opinion of the International Searching Authority, or the Declaration", International Appl. No. PCT/US2012/027989, International Filing Date Mar. 7, 2011, European Patent Office, mailed Jun. 1, 2012, 13 pages.

Thubert, et al., "RPL Objective Function Zero", draft-ietf-roll-of0-05, IETF Internet-Draft, Jan. 2011, 10 pages.

Vasseur, et al., "Routing Metrics Used for Path Calculation in Low Power and Lossy Networks", draft-ietf-roll-routing-metrics-18, IETF Internet-Draft, Feb. 2011, 31 pages.

Winter, et al., "RPL: IPv6 Routing Protocol for Low Power and Lossy Networks", draft-ietf-roll-rpi-18, IETF Internet-Draft; Feb. 2011, 160 pages.

Moon, et al., "Notification Concerning Transmittal of International Preliminary Report on Patentability" Patent Cooperation Treaty, International Application No. PCT/US2012/027989, mailed Sep. 19, 2013, 8 pages, The International Bureau of World Intellectual Property Organization, Geneva, Switzerland.

* cited by examiner

REMOTE STITCHED DIRECTED ACYCLIC GRAPHS

TECHNICAL FIELD

The present disclosure relates generally to computer networks, and, more particularly, to directed acyclic graph (DAG) routing and management.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

DAGs may illustratively be optimized against a variety of metrics and constraints (e.g., reliability, latency, etc.), along which data is collected and reported to a sink usually connected close to a DAG root. For example, the DAG may be built so as to optimize a particular metric such as the ETX (estimated transmission count) and usually have a low-frequency reporting rate so as to limit the traffic in the network, avoid congestion and delays, and increase the network life duration. These DAG properties are generally globalized for use by the entire DAG, and currently, if there is any reason to change the properties for any location within the DAG (e.g., localized events), the entire DAG is rebuilt with these changed properties.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
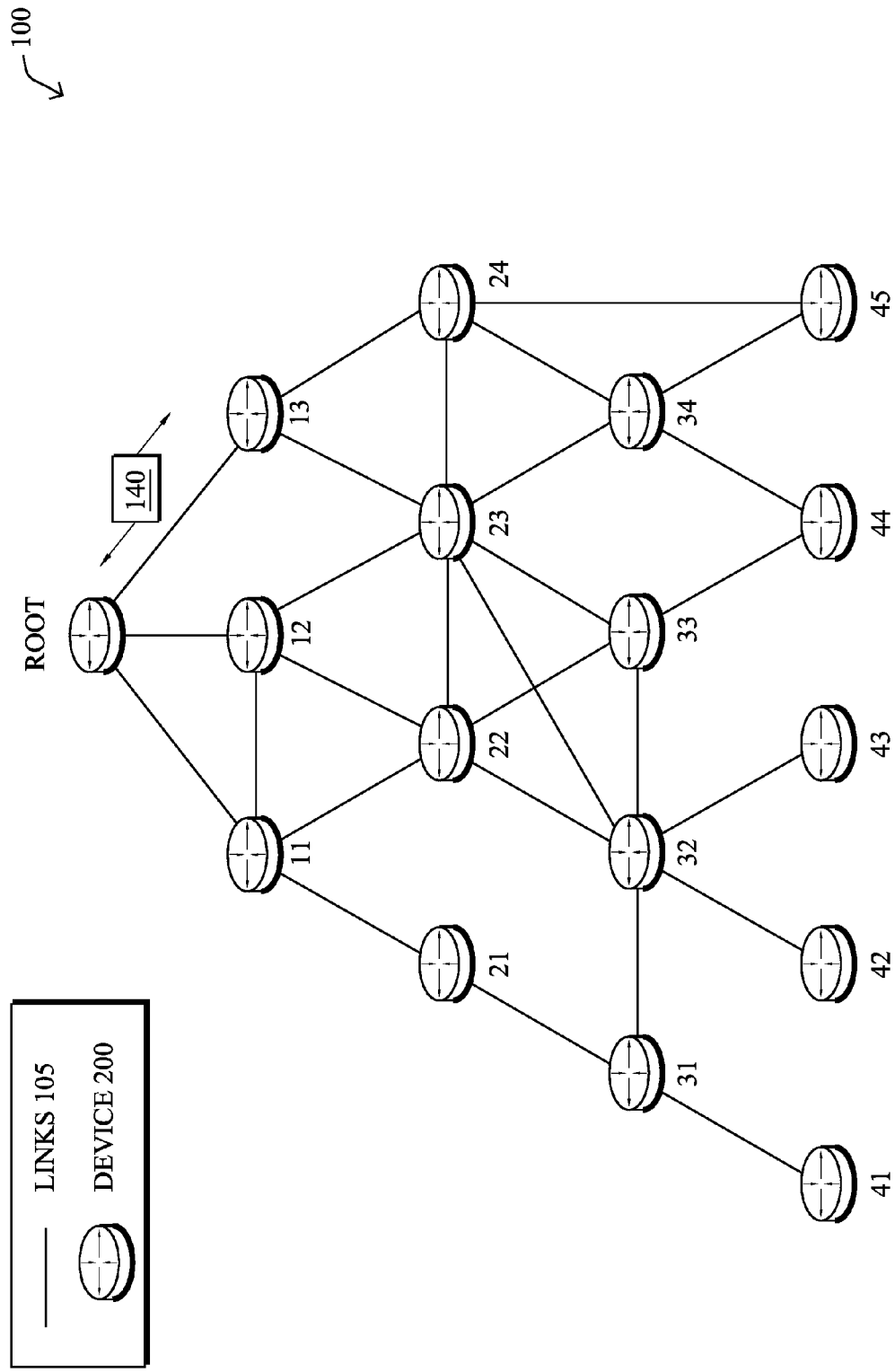
FIG. 1 illustrates an example computer network.

According to one or more embodiments of the disclosure, in response to a trigger condition being detected at a particular location in a primary directed acyclic graph (DAG) in a computer network, a particular node in the primary DAG at the particular location may be determined to act as a remote stitched (RS)-DAG root for an RS-DAG at the particular location. The determined RS-DAG root may then be instructed to initiate the RS-DAG, the instructing indicating one or more properties for the RS-DAG that are based on the trigger condition and that are different from properties of the primary DAG.

According to one or more additional embodiments of the disclosure, a particular node at a particular location in a primary DAG receives instructions to initiate an RS-DAG as its RS-DAG root, where the instructions indicate one or more properties for the RS-DAG that are different from properties of the primary DAG. In response, the RS-DAG root then initiates the RS-DAG and relays messages of the RS-DAG with a primary root of the primary DAG.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200 (e.g., labeled as shown, "Root," "11," "12," ... "44," "45," and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, wireless/shared media protocols (e.g., IEEE Std. 802.15.4, WiFi, Bluetooth®, etc.), etc. In this context, a protocol consists of a set of rules defining how the nodes interact with each other. In addition, packets within the network 100 may be transmitted in a different manner depending upon device capabilities, such as source routed packets.

Figure 2:
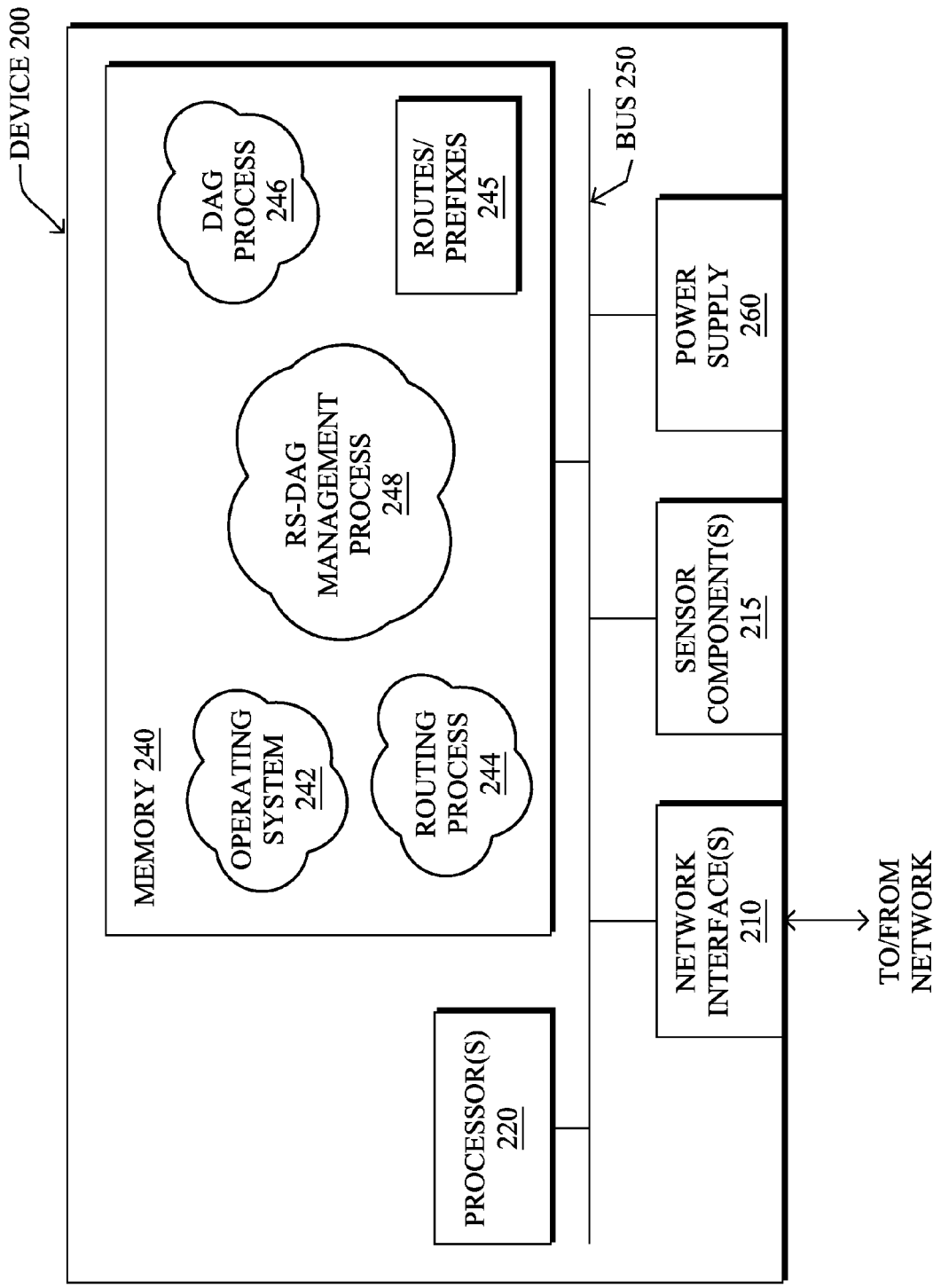
FIG. 2 illustrates an example network device/node.

FIG. 2 is a schematic block diagram of an example node/device 200 that may be used with one or more embodiments described herein, e.g., as nodes 11-45 and ROOT. The device may comprise one or more network interfaces 210 (e.g., wired and/or wireless), an optional sensor component 215 (e.g., sensors/actuators for sensor network devices), at least one processor 220 (e.g., an 8-64 bit microcontroller), and a memory 240 interconnected by a system bus 250, as well as a power supply 260 (e.g., battery, plug-in, etc.). Notably, a root node, as well as other nodes, need not contain a sensor component 215.

The network interface(s) 210 contain the mechanical, electrical, and signaling circuitry for communicating data over physical and/or wireless links 105 coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, broadband over power lines (BPL), etc. Note that the root may have two different types of network connections 210. Namely, one or more interfaces may be used to communicate with the mesh network (into the mesh cell), i.e., the other nodes shown in FIG. 1, while for the root node, another interface may be used as a WAN uplink network interface between the root node and, for example, a head-end device located through the WAN.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, for root-capable devices (or other management devices), an "RS-DAG" management process 248 may also be present in memory 240, for use as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes (e.g., RS-DAG management process 248 may be a particular sub-routine of DAG process 246).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-18> by Winter, at al. (Feb. 4, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-18> by Vasseur, et al. (Feb. 22, 2011 version). Further, an example OF (e.g., a default OF) may be found in an IETF Internet Draft, entitled "RPL Objective Function 0"<draft-ietf-roll-of0-05> by Thubert (Jan. 5, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 3:
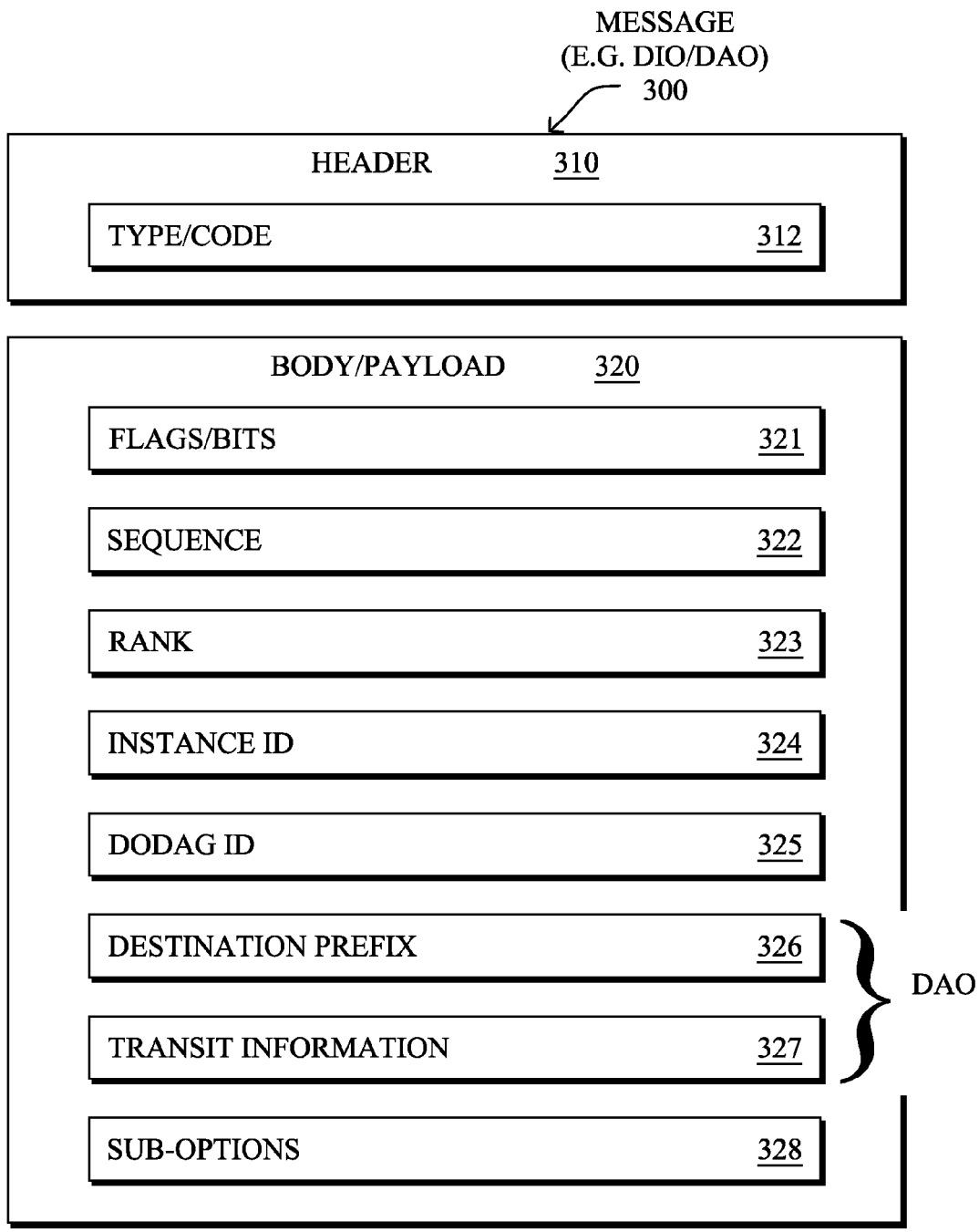
FIG. 3 illustrates an example message.

FIG. 3 illustrates an example simplified control message format 300 that may be used for discovery and route dissemination when building a DAG, e.g., as a DIO or DAO. Message 300 illustratively comprises a header 310 with one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, etc., as may be described herein, e.g., in one or more type-length-value (TLV) fields.

Figure 4:
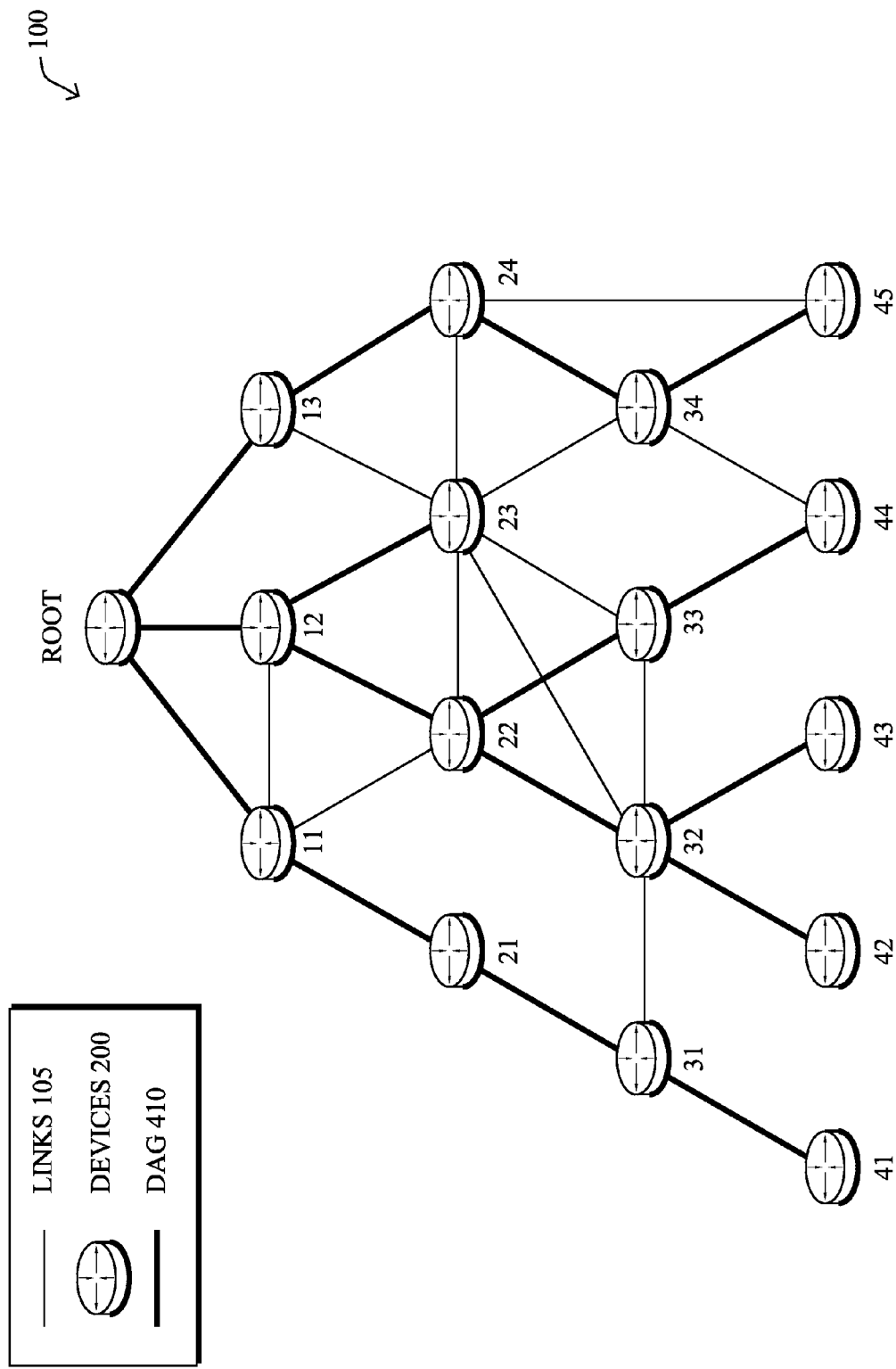
FIG. 4 illustrates an example directed acyclic graph (DAG) in the computer network of FIG. 1.

FIG. 4 illustrates an example simplified DAG that may be created, e.g., through the techniques described above (by DAG process 246), within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes.

As noted above, DAGs may illustratively be optimized against a variety of metrics and constraints (e.g., reliability, latency, etc.), along which data is collected and reported to a sink usually connected close to a DAG root. For example, the DAG may be built so as to optimize a particular metric such as the ETX (estimated transmission count) and usually have a low-frequency reporting rate so as to limit the traffic in the network, avoid congestion and delays, and increase the network life duration. These DAG properties are generally globalized for use by the entire DAG, and currently, if there is any reason to change the properties for any location within the DAG (e.g., localized events), the entire DAG is rebuilt with these changed properties.

In particular, there are situations where an abnormal behavior may be detected in a DAG. For example, because of external interferences a region of the DAG may experience a sudden high rate of link failures, requiring a large amount of network statistics to be gathered to troubleshoot the network. Another situation may be that an abnormal situation can be detected (e.g., a series of sensors reporting low power quality, a high radioactivity, etc.). In both cases, it may be desired to start collecting more information in a particular region of the DAG. Currently, however, this would impose a rebuild of the entire DAG 410 with different characteristics/properties.

Remote Stitched DAGs (RS-DAGs)

The techniques herein provide a mechanism whereby a remote stitched (RS)-DAG is established in a particular location in a primary DAG with different properties from the primary DAG. In particular, as described in greater detail below, the RS-DAG (which may have a temporary life) may be created in response to a trigger condition and used to gather a large amount of information in a region of the network in order to be locally analyzed and/or aggregated before being relayed to the primary DAG root in order to minimize the network impact, thus without compromising the stability of the entire primary DAG.

Specifically, according to one or more embodiments of the disclosure as described in detail below, in response to a trigger condition being detected at a particular location in a primary DAG in a computer network, a particular node in the primary DAG at the particular location may be determined to act as a remote stitched (RS)-DAG root for an RS-DAG at the particular location. The determined RS-DAG root may then be instructed to initiate the RS-DAG, the instructing indicating one or more properties for the RS-DAG that are based on the trigger condition and that are different from properties of the primary DAG. According to one or more additional embodiments, a particular node receives instructions to initiate an RS-DAG as its RS-DAG root, initiates the RS-DAG, and relays messages of the RS-DAG with a primary root of the primary DAG. In accordance with yet another specific embodiment, nodes which are capable of becoming an RS DAG root may construct an RS-DAG before a trigger condition, and may keep the RS DAG readily available for activation when a trigger condition actually occurs.

Illustratively, the techniques described herein may be performed by hardware, software, and/or firmware, such as in accordance with RS-DAG process 248, which may contain computer executable instructions executed by the processor 220 to perform functions relating to the novel techniques described herein, e.g., in conjunction with routing process 244 and DAG process 246. For example, the techniques herein may be treated as extensions to conventional protocols, such as the RPL protocol, and as such, would be processed by similar components understood in the art that execute the RPL protocol, accordingly.

Operationally, a root node or management node (e.g., a head-end node) may identify an area of specific interest. An area of interest could illustratively be a subset of nodes identified by their location and/or capabilities, or based on a group of nodes that behave globally abnormally or that report data that requires further investigation. For example in a large cities potentially comprising hundreds of thousands of nodes, a network management system (NMS) may notice a set of sensors reporting abnormally elevated level of toxic gas, or a set of electric meters located in an area may report issues related to the power quality, etc.

Figure 5A:
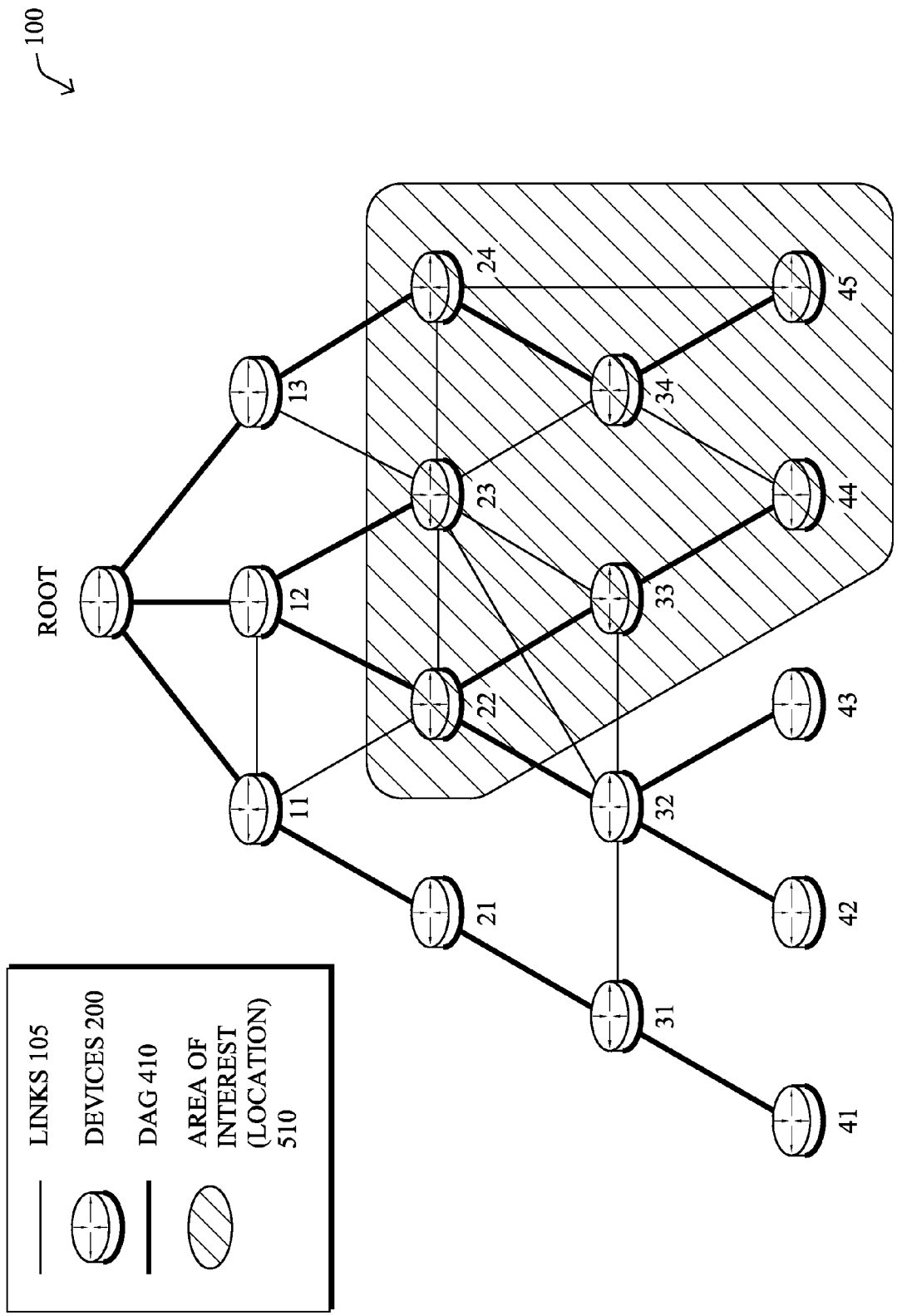
FIG. 5A illustrates an example of an area of interest in the DAG of FIG. 4.

FIG. 5A illustrates the DAG 410 of FIG. 4 with an area of interest 510. In particular, by detecting a trigger condition at a particular location (area of interest) 510 in a primary DAG 410, such as by identifying an abnormal situation (networking misbehavior, physical phenomena, etc.) and/or an area or event which may require temporary gathering of a larger amount of data, a root/management node may determine a particular location to establish an RS-DAG. Illustratively, this area of interest is located near nodes 22, 23, 24, 33, 34, 44, and 45. For example, each of these nodes may have reported some data of interest to be further investigated, or a particular node or nodes may have done so (e.g., node 34), and it may be desired to corroborate this information with surrounding neighbors. Note that trigger conditions in general may comprise, among other things, a sensed event at the particular location, congestion at the particular location, greater than a threshold of lost packets at the particular location, link failure at the particular location, or other (e.g., periodic) maintenance or data collection situations.

Based on the particular location 510, the root/management node may determine a particular node in the primary DAG 410 to act as an RS-DAG root for an RS-DAG at the particular location. For example, based on various factors, such as proximity, ability (e.g., configured and/or capable of performing as such), etc., a particular node may be chosen over others in the area as the RS-DAG root. Note that the particular location may be any identifiable set of nodes within the DAG 410, such as a particular subnet mask, a list of one or more specific addresses or node IDs, a geographical positioning, a set of devices reporting a particular set of data or a particular value of data, a set of devices within an identified distance from a particular device, etc. Alternatively, in one embodiment, the area of interest may be identified by network management (e.g., head-end) software and communicated to the relevant nodes via the primary root node.

Figure 5B:
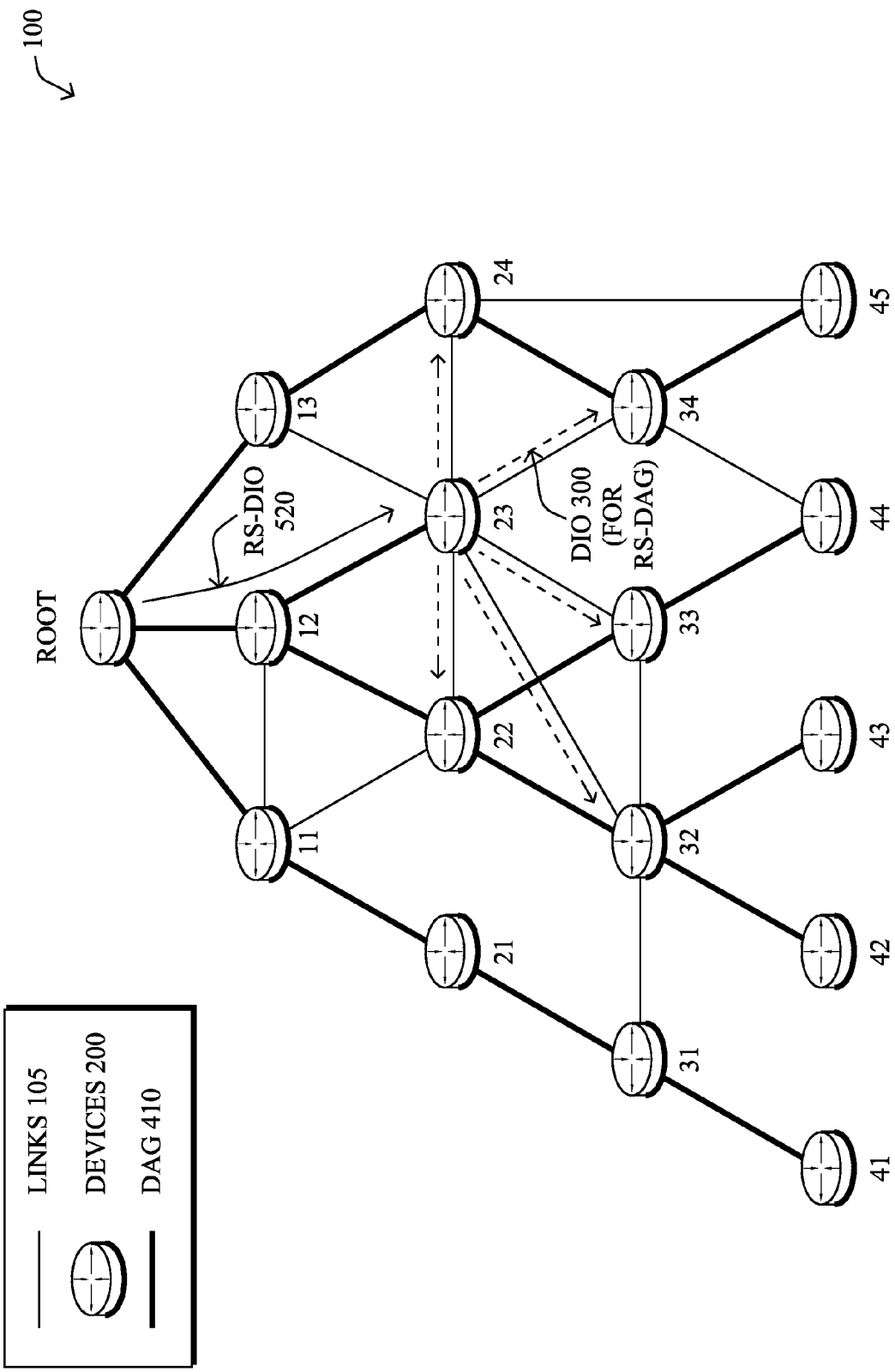
FIG. 5B illustrates an example of a message exchange.

Once the RS-DAG root node is determined (e.g., nod 23), the root/management node instructs (or conveys the message from a head-end node instruct) the RS-DAG root to initiate an RS-DAG. For instance, FIG. 5B shows an example message exchange where an illustrative unicast control message, "RS-DIO" message 520, is sent to the RS-DAG root node candidate. Note that the RS-DIO is sent as a unicast data packet and is not processed by any node between the primary DAG root and the root of the RS-DAG. The RS-DIO message 520 may be structured similarly to DIO message 300 above, and comprises the set of parameters of the RS-DAG (e.g., (RPLInstanceID, mode of operation or "MOP," etc.) along with an identification of the zone of interest 510. Optionally a special flag may be set in the RS-DIO indicating that it is strongly suggested that nodes receiving the RS-DIO join the RS-DAG (e.g., such that the RS-DAG may be considered a "critical DAG" by the nodes).

Note that a DODAG ID (e.g., field 325 of DIO 300) in the RS-DIO may be set to the address (e.g., IPv6) of the destination of the RS-DAG message, i.e., the selected RS-DAG root. Also, the area of interest could be identified (e.g., in sub-options field 328) thanks to a subnet mask (all routers with the subnet mask should join the RS-DAG), a list of specific address, a list of routers identified by geographical positioning, etc. Alternatively, the area of interest could simply be defined as a depth of the RS-DAG, thus limiting the size of the RS-DAG to a set of nodes within a particular distance of the chosen RS-DAG root. Also, a list of one or more nodes in the primary DAG to specifically exclude or include from the RS-DAG could be included within the identification of the area of interest (or as an RS-DAG property).

According to one or more embodiment herein, instruction (RS-DIO 520) indicates one or more properties for the RS-DAG to be built. Specifically, these properties are different from properties of the primary DAG (e.g., significantly so), and may generally be based on the trigger condition detect above. That is, the RS-DIO 520 also comprises information that will be carried within the DIO message 300 generated that will be by the root of the RS-DAG for the new RS-DAG. For example, such RS-DAG properties may define a new set of timers to use, a different set of routing metrics (e.g., optimizing the delays, where the primary DAG 410 may try to optimize the path quality using the ETX, for example), a different Objective Function (OF) generally, e.g., to increase the degree of meshing, define the use of network load balancing, etc. Additionally, RS-DAG properties that may be defined could also include a length of time to maintain the RS-DAG, a limited depth for the RS-DAG (note above), and an increased sensing rate for sensor nodes in the RS-DAG, e.g., signaling to the nodes in the area of interest to send additional data with a higher frequency while the RS-DAG is active. (Note that a lower frequency may also be requested, such as to quell a "noisy" area of interest sending more information than is needed, such as repeatedly indicating the same alarm, etc.) Note also that in one embodiment the DAG properties may be used to provide application level indication, such as, for example, requesting the report of a specific type of data every so many seconds).

Upon receiving a RS-DIO message 520, the receiver, the selected RS-DAG root (e.g., node 23), may initiate the formation of the new RS-DAG according to the information received. It should be noted that as described above the construction of the RS-DAG may take place in parallel to the construction of the primary DAG, which is used for the normal routing of messages through the network. That is, the RS-DAG may be initiated by the RS-DAG root during creation of the primary DAG, and thus prior to receiving any trigger condition notification, such that the RS-DAG may be quickly "activated" (e.g., to begin relaying messages, as described below) in response to receiving a trigger condition notification from the primary root.

Figure 5C:
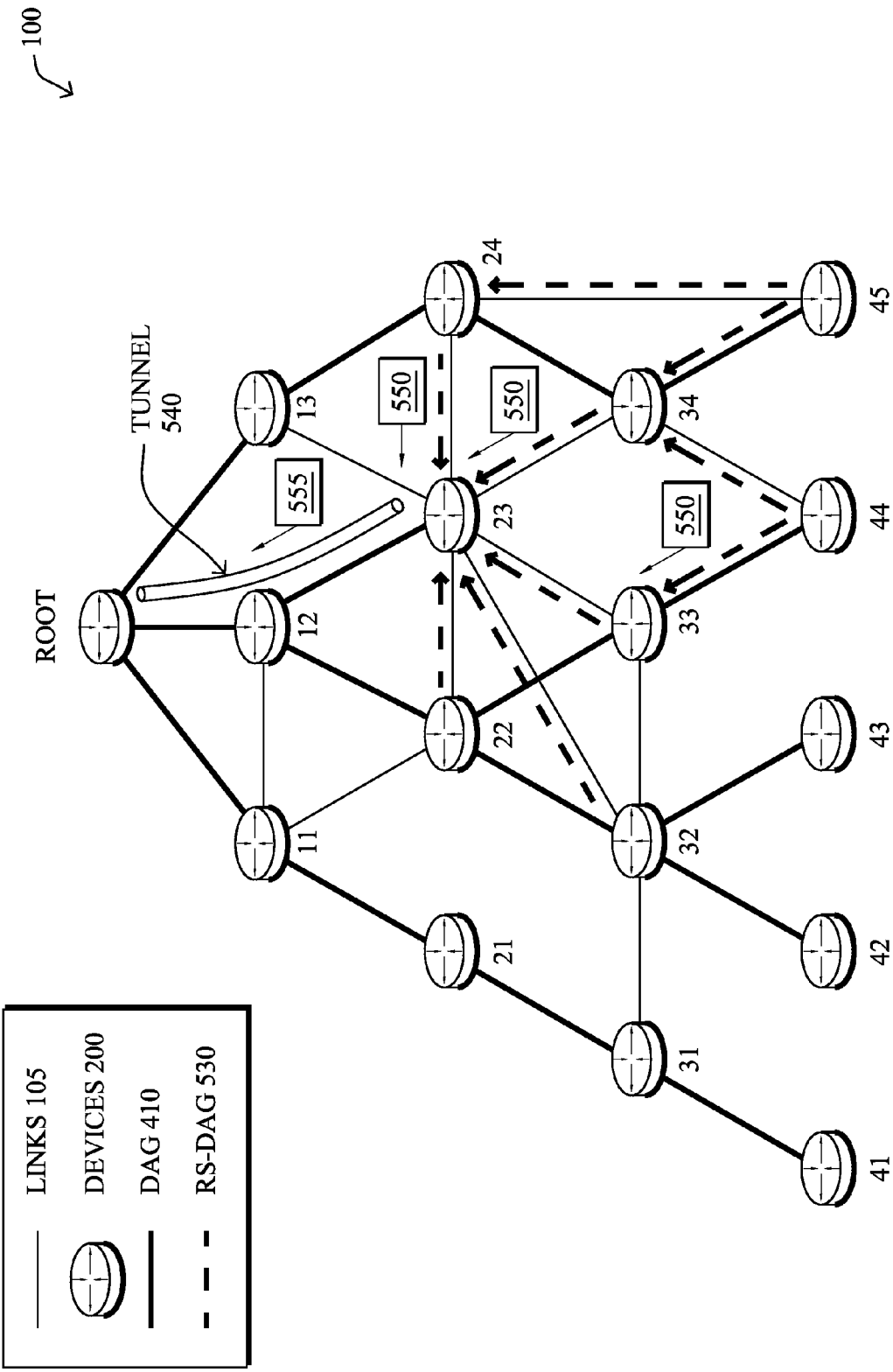
FIG. 5C illustrates an example remote stitched (RS)-DAG.

FIG. 5C illustrates an example RS-DAG 530 that is created within the area of interest 510 based on the RS-DAG properties defined in RS-DIO 520 (and subsequently DIO 300, as shown in FIG. 5B). Note that the primary DAG 410 is preserved by all nodes not in the area of interest 510, and in certain embodiments, may possibly be simultaneously utilized for other traffic to and from the nodes within the area of interest, where nodes are capable of differentiating such traffic. Note also that RS-DAG 530 illustrates a level of redundancy (multiple parent nodes), while the primary DAG 410 has no such redundancy in place.

Once the RS-DAG 530 is established, the RS-DAG root (e.g., node 23) can relay messages of the RS-DAG between itself and the primary DAG root (relayed messages 555). Note that the relayed messages 555 may be transmitted on the primary DAG 410 as conventional messages, or else may be sent on an established tunnel 540 between the primary DAG root and the RS-DAG root. According to one or more embodiments herein, a role of the RS-DAG may be to specifically gather more data 550 for a limited period of time so as to analyze a temporary situation (e.g., misbehavior of the network or physical phenomena) without impacting the whole network. The RS-DAG root may then be responsible for collecting a larger amount of data 550, and relaying it to the primary DAG root as relayed messages 555.

According to one or more embodiments, for example, due to the high volume of data 550, the RS-DAG root may be specifically configured in certain embodiments to aggregate the data 550, or even perform remote analysis of the trigger condition and report it back to the primary DAG root (or other management node). For instance, in such embodiments, the aggregation or analysis may be one of the RS-DAG properties instructed by the RS-DIO, signaling that local traffic of the RS-DAG should traverse a data aggregator/analyzer, e.g., to avoid traffic congestion. Data aggregation, in particular, may imply that multiple shorter messages 550 are taken and made into a single longer message 555. Data analyzing, on the other hand, takes many massages 550, correlates or otherwise processes them, and makes a decision based on these multiple messages to send a conclusion message 555 uplink to the primary DAG root. (Note that in certain embodiments herein, the data aggregator or analyzer may be a node other than the RS-DAG root that is configured to aggregate and/or analyze the data 550, and sends the analyzed data to the RS-DAG root for forwarding, or else directly to the primary DAG root.)

Note also that while the nodes of the RS-DAG may generally be used to collect information 550 to be sent to the primary DAG root via the RS-DAG root (e.g., based on certain changed reporting and/or metering properties), in certain embodiments the RS-DAG may be utilized to relay information to the nodes of the RS-DAG. That is, the primary DAG root node may have a reason to reach the particular area of interest 510 separately from the rest of the primary DAG 410, and as such, may use the RS-DAG as a type of multicast DAG based on location, to which any node in the area of interest would receive any messages directed onto the RS-DAG 530.

If the RS-DIO message 520 comprised a lifetime limit for the RS-DAG, such as an actual time and/or a number of messages to relay (e.g., one or more), then the root of the RS-DAG may start a timer (or counter) during RS-DAG establishment, after the expiration of which, the RS-DAG root tears down the RS-DAG, illustratively by poisoning the RS-DAG. Alternatively, the nodes of the RS-DAG may be aware of the timer or counter, and could migrate back to the primary independently, e.g., after one use.

Figure 6:
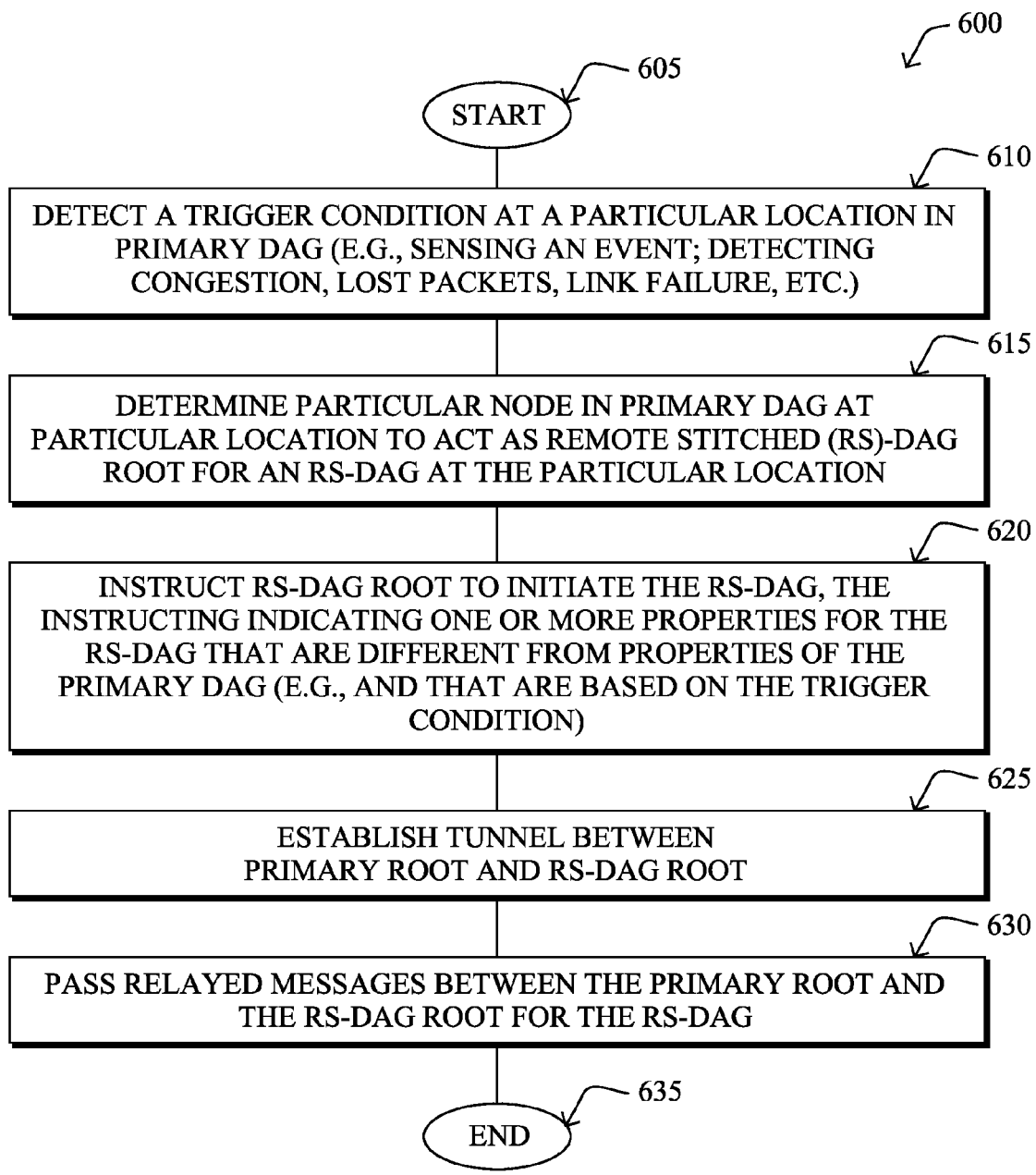
FIG. 6 illustrates an example simplified procedure for operating an RS-DAG, from the perspective of a root/management node.

FIG. 6 illustrates an example simplified procedure for operating an RS-DAG 530 in accordance with one or more embodiments described herein, e.g., from the perspective the root/management node. The procedure 600 starts at step 605, and continues to step 610, where the root/management node detects a trigger condition at a particular location 510 in the primary DAG 410 as described above. For example, the trigger condition may be a sensed event or detected congestion, lost packets, link failure, etc. In step 615, a particular node in the primary DAG at the particular location may be determined/selected to act as the RS-DAG root for an RS-DAG 530 at the particular location. The RS-DAG root (e.g., node 23) may then be instructed in step 620 to initiate the RS-DAG (e.g., via RS DIO 520), the instructing indicating one or more properties for the RS-DAG that are different from properties of the primary DAG (e.g., and that are based on the trigger condition), as described in detail above. A tunnel 540 may then be established in step 625 between the primary DAG root and the RS-DAG root, and in step 630 relayed messages 555 may be passed between the primary root and the RS-DAG root for the RS-DAG. The procedure 600 ends in step 635, such as, e.g., once the RS-DAG 530 is no to longer required (tearing it down), or after a certain length of time identified in the RS-DAG properties.

Figure 7:
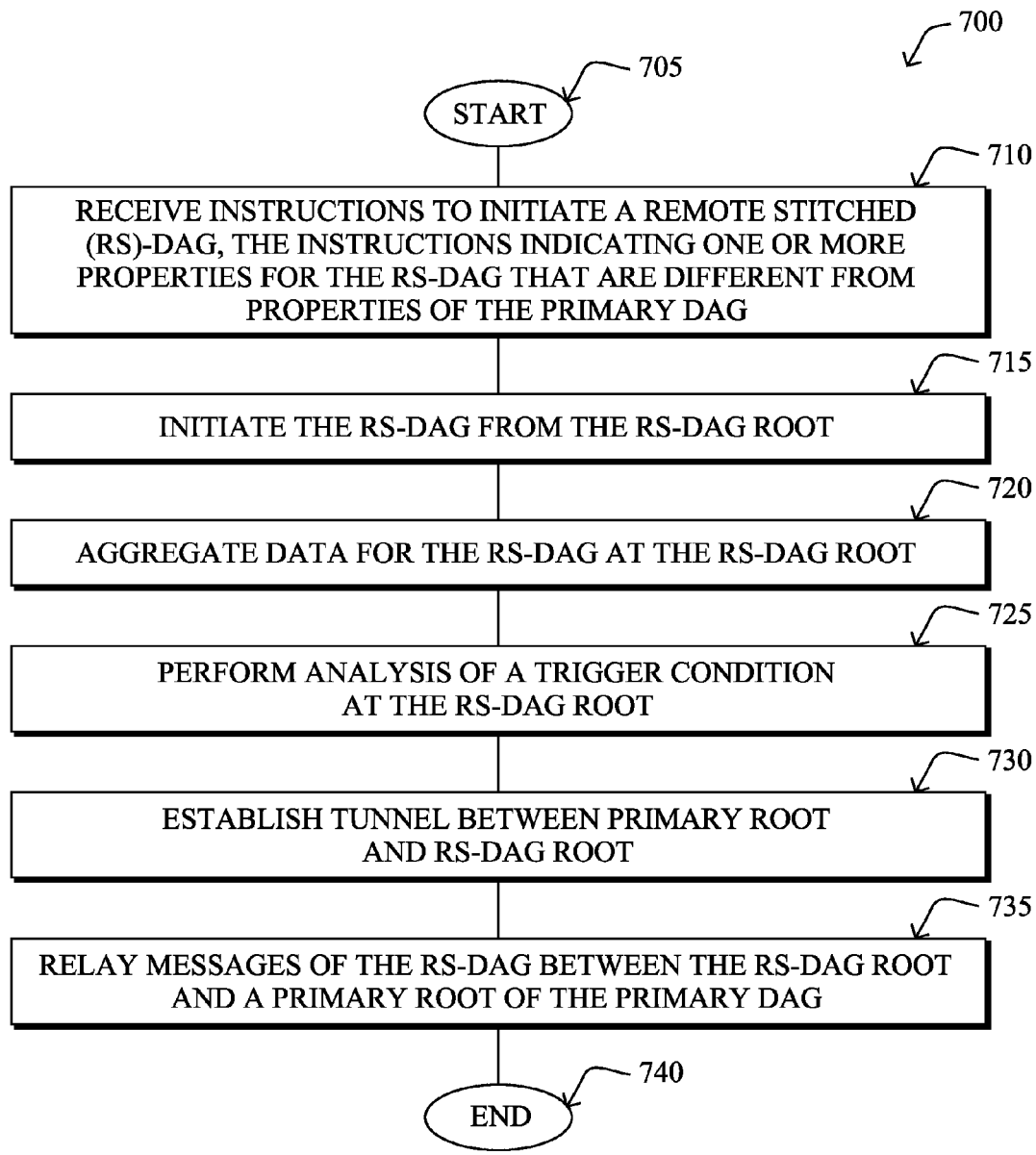
FIG. 7 illustrates an example simplified procedure for operating an RS-DAG, from the perspective of the RS-DAG root.

In addition, FIG. 7 illustrates another example simplified procedure for operating an RS-DAG 530 in accordance with one or more embodiments described herein, e.g., from the perspective of the RS-DAG root. The procedure 700 starts at step 705, and continues to step 710, where a particular node in the primary DAG 410 (e.g., node 23) receives instructions to initiate an RS-DAG, where the instructions indicate one or more properties for the RS-DAG that may be different from properties of the primary DAG. In response, in step 715, the selected RS-DAG root initiates the RS-DAG 530. As noted above, in one or more embodiments herein, the RS-DAG root may optionally aggregate data for the RS-DAG in step 720, and/or may also optionally perform analysis of a particular trigger condition (e.g., a condition that prompted the creation of the RS-DAG as mentioned above) in step 725. In step 730, the RS-DAG may establish a tunnel 540 with the primary root, and in step 735 relays messages of the RS-DAG with primary root (e.g., to or from the RS-DAG). The procedure 700 ends in step 740, e.g., once the RS-DAG 530 is no longer required (tearing it down in response to another instruction), or after a certain length of time identified in the RS-DAG properties.

It should be noted that FIGS. 6-7 are merely examples for illustration, and are not meant to be limiting to the scope of the embodiments herein. For instance, while certain steps within the procedures 600 and 700 may be optional as described above, certain steps may be included or excluded as desired, and the steps may also be in a different order where suitable.

The novel techniques described herein, therefore, provide for RS-DAGs in a computer network. In particular, the techniques herein create remote localized RS-DAGs (e.g., in response to a "problem area"), and may change the routing behavior of the DAG and/or the data collection behavior of that RS-DAG. For instance, RS-DAGs may be used as an efficient mechanism to troubleshoot a critical situation that would benefit from gathering a large amount of data for a short period of time without globally impacting the primary DAG in use. Illustratively, some example uses of RS-DAGs may include troubleshooting of the network or obtaining finer granularity of sensed data, such as in an alarm situation or other high-priority sensing situation (e.g., radioactivity, fire, etc.). Further, an illustrate example use of RS-DAGs includes a security mechanism to specifically avoid (e.g., tunnel around) a particular node in the network, such as one that is suspected of supplying faulty information, either maliciously or due to a malfunction.

While there have been shown and described illustrative embodiments that provide for RS-DAGs in a computer network, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not as limited, and may, in fact, be used with other types of networks and/or protocols utilizing DAG routing (e.g., distance vector protocols). Also, while the techniques described above generally reference particular trigger conditions and/or DAG properties, other trigger conditions and/or DAG properties may be used, and those mentioned herein are merely examples.

Further, while the decision to establish (and/or activate) an RS-DAG has been generally described as an action performed by the primary DAG root node, or more particularly, by a node other than the selected RS-DAG root node (e.g., an application in a head-end node), it is possible in one or more embodiments herein that the RS-DAG root node itself self-initiates (self-activates) the RS-DAG in response to a detected trigger event. That is, while the embodiments above show an RS DIO message 520 being transmitted to the RS-DAG root, the RS-DAG root may alternatively be configured to establish an RS-DAG on its own, adjust routing and/or reporting properties of the RS-DAG, and relay messages to the root/management node. This independent operation may be beneficial in trusted situations to alleviate root/management node control, or for time-sensitive reactions, such as detecting an emergency sensed value (e.g., radioactivity, fire, etc.), and creating an RS-DAG to quickly gather surrounding information, which may be aggregated before reporting anything to the root/management node (or after an initial report of the emergency in the first place. For example, if a node configured with the ability to act as an RS-DAG root detects, e.g., a fire alarm message, then in response this node may trigger messages to other nodes/sensors in the neighborhood to find out if the other sensors observe the same condition, or else is it the case that the specific node's sensor is malfunctioning.

Moreover, the "depth" of the RS-DAG may be set to "0" (zero), such that a particular location 510 may simply be a singular device, i.e., the RS-DAG root itself (with no child nodes in the RS-DAG). This may be useful, for example, to maintain the reporting behavior of that single device separate from the rest of the primary DAG 410.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    detecting, by a network device, a trigger condition at a particular location in a primary directed acyclic graph (DAG) in a computer network, wherein the primary DAG includes a root node of the primary DAG;
    determining, by the network device, a particular node in the primary DAG at the particular location to act as a remote stitched (RS)-DAG root for an RS-DAG at the particular location, wherein the particular node is a different node in the primary DAG than the root node of the primary DAG;
    instructing, by the network device, the RS-DAG root to initiate the RS-DAG, the instructing indicating one or more properties for the RS-DAG that are selected to cause additional data regarding the trigger condition to be collected within the RS-DAG and that are different from properties of the primary DAG, wherein a particular child node of the RS-DAG root in the RS-DAG has a different parent node in the primary DAG; and
    receiving, at the network device, a conclusion message from the RS-DAG root that aggregates the additional data regarding the trigger condition collected within the RS-DAG.

2. The method as in claim 1, wherein the trigger condition is a sensed event at the particular location.

3. The method as in claim 1, wherein the trigger condition is selected from a group consisting of: congestion at the particular location, greater than a threshold of lost packets at the particular location, and link failure at the particular location.

4. The method as in claim 1, wherein one of the one or more properties for the RS-DAG comprises one or more routing metrics for the RS-DAG.

5. The method as in claim 1, wherein one of the one or more properties for the RS-DAG comprises a list of one or more nodes in the primary DAG to specifically exclude or include from the RS-DAG.

6. The method as in claim 1, wherein one of the one or more properties for the RS-DAG comprises a length of time to maintain the RS-DAG.

7. The method as in claim 1, wherein one of the one or more properties for the RS-DAG comprises an increased sensing rate for sensor nodes in the RS-DAG.

8. The method as in claim 1, wherein one of the one or more properties for the RS-DAG comprises an objective function (OF) for the RS-DAG.

9. The method as in claim 1, wherein one of the one or more properties for the RS-DAG comprises a limited depth for the RS-DAG.

10. The method as in claim 1, wherein one of the one or more properties for the RS-DAG comprises data aggregation properties for the RS-DAG.

11. The method as in claim 1, wherein the particular location is selected from a group consisting of: a subnet mask, a list of one or more specific addresses, a geographical positioning, a particular device, and a set of devices within an identified distance from a particular device.

12. method as in claim 1, further comprising:
    establishing a tunnel between the root node of the primary DAG and the RS-DAG root.

13. The method as in claim 1, wherein the network device is root node of the primary DAG or a network management node in the computer network.

14. An apparatus, comprising:
    one or more network interfaces to communicate in a computer network;
    a processor coupled to the one or more network interfaces and adapted to execute one or more processes; and
    a memory configured to store a process executable by the processor, the process when executed configured to:
        detect a trigger condition at a particular location in a primary directed acyclic graph (DAG) in the computer network, wherein the primary DAG includes a root node of the primary DAG;
        determine a particular node in the primary DAG at the particular location to act as a remote stitched (RS)-DAG root for an RS-DAG at the particular location, wherein the particular node is a different node in the primary DAG than the root node of the primary DAG;
        instruct the RS-DAG root to initiate the RS-DAG, the instructing indicating one or more properties for the RS-DAG that are selected to cause additional data regarding the trigger condition to be collected within the RS-DAG and that are different from properties of the primary DAG, wherein a particular child node of the RS-DAG root in the RS-DAG has a different parent node in the primary DAG; and
        receive a conclusion message from the RS-DAG root that aggregates the additional data regarding the trigger condition collected within the RS-DAG.

15. The apparatus as in claim 14, wherein the trigger condition is selected from a group consisting of: a sensed event at the particular location, congestion at the particular location, greater than a threshold of lost packets at the particular location, and link failure at the particular location.

16. The apparatus as in claim 14, wherein the one or more properties for the RS-DAG are selected from a group consisting of: one or more routing metrics for the RS-DAG, a list of one or more nodes in the primary DAG to specifically exclude or include from the RS-DAG, a length of time to maintain the RS-DAG, an increased sensing rate for sensor nodes in the RS-DAG, an objective function (OF) for the RS-DAG, a limited depth for the RS-DAG, and data aggregation properties for the RS-DAG.

17. A tangible, non-transitory, computer-readable media having software encoded thereon, the software when executed by a processor configured to:
   detect a trigger condition at a particular location in a primary directed acyclic graph (DAG) in a computer network, wherein the primary DAG includes a root node of the primary DAG;
   determine a particular node in the primary DAG at the particular location to act as a remote stitched (RS)-DAG root for an RS-DAG at the particular location, wherein the particular node is a different node in the primary DAG than the root of the primary DAG;
   instruct the RS-DAG root to initiate the RS-DAG, the instructing indicating one or more properties for the RS-DAG that are selected to cause additional data regarding the trigger condition to be collected within the RS-DAG and that are different from properties of the primary DAG, wherein a particular child node of the RS-DAG root in the RS-DAG has a different parent node in the primary DAG; and
   receive a conclusion message from the RS-DAG root that aggregates the additional data regarding the trigger condition collected within the RS-DAG.

18. A method, comprising:
   receiving, by a network device that is a particular node at a particular location in a primary directed acyclic graph (DAG) in a computer network, instructions to initiate a remote stitched (RS)-DAG by the particular node as an RS-DAG root, the instructions indicating one or more properties for the RS-DAG that are different from properties of the primary DAG, wherein the RS-DAG root is a different node in the primary DAG than a root node of the primary DAG;
   initiating, by the network device, the RS-DAG from the RS-DAG root to collect additional data within the RS-DAG regarding a triggering condition, wherein a particular child node of the RS-DAG root in the RS-DAG has a different parent node in the primary DAG; and
   relaying, by the network device, messages of the RS-DAG between the RS-DAG root and the root node of the primary DAG that include the collected additional data.

19. The method as in claim 18, wherein the one or more properties for the RS-DAG are selected from a group consisting of: one or more routing metrics for the RS-DAG, a list of one or more nodes in the primary DAG to specifically exclude or include from the RS-DAG, a length of time to maintain the RS-DAG, an increased sensing rate for sensor nodes in the RS-DAG, an objective function (OF) for the RS-DAG, and a limited depth for the RS-DAG.

20. The method as in claim 18, wherein one of the one or more properties for the RS-DAG comprises data aggregation properties for the RS-DAG, the method further comprising:
   aggregating the collected additional data at the RS-DAG root.

21. The method as in claim 18, further comprising:
   establishing a tunnel between the root node of the primary DAG and the RS-DAG root.

22. The method as in claim 18, wherein the one or more properties of the RS-DAG are based on the trigger condition, the method further comprising:
   performing an analysis of the trigger condition at the RS-DAG root.

23. The method as in claim 18, wherein relaying messages of the RS-DAG between the RS-DAG root and the root node of the primary DAG is in response to receiving a trigger condition notification from the root node of the primary DAG regarding the trigger condition, and wherein the RS-DAG is initiated prior to receiving the trigger condition notification.

24. The method as in claim 18, wherein receiving instructions to initiate the RS-DAG by the particular node comprises:
   detecting the trigger condition by the particular node, the instructions indicating one or more properties for the RS-DAG that are different from properties of the primary DAG and that are based on the trigger condition.

25. An apparatus, comprising:
   one or more network interfaces to communicate as a particular node at a particular location in a primary directed acyclic graph (DAG) in a computer network, wherein the primary DAG includes a root node of the primary DAG;
   a processor coupled to the one or more network interfaces and adapted to execute one or more processes; and
   a memory configured to store a process executable by the processor, the process when executed configured to:
      receive instructions to initiate a remote stitched (RS)-DAG by the particular node as an RS-DAG root, the instructions indicating one or more properties for the RS-DAG that are different from properties of the primary DAG, wherein the particular node is a different node in the primary DAG than the root node of the primary DAG;
      initiate the RS-DAG from the RS-DAG root to collect additional data within the RS-DAG regarding a triggering condition, wherein a particular child node of the RS-DAG root in the RS-DAG has a different parent node in the primary DAG; and
      relay messages of the RS-DAG between the RS-DAG root and a primary root of the primary DAG that include the collected additional data.

26. The apparatus as in claim 25, wherein the one or more properties for the RS-DAG are selected from a group consisting of: one or more routing metrics for the RS-DAG, a list of one or more nodes in the primary DAG to specifically exclude or include from the RS-DAG, a length of time to maintain the RS-DAG, an increased sensing rate for sensor nodes in the RS-DAG, an objective function (OF) for the RS-DAG, a limited depth for the RS-DAG, and data aggregation properties for the RS-DAG.

27. The apparatus as in claim 25, wherein the one or more properties of the RS-DAG are based on the trigger condition, the process when executed further configured to:
   perform an analysis of the trigger condition.

28. The apparatus as in claim 25, wherein the process is configured to relay messages of the RS-DAG between the RS-DAG root and the primary root is in response to receiving a trigger condition notification from the root node of the primary DAG, and wherein the process is configured to initiate the RS-DAG prior to receiving the trigger condition notification.

29. A tangible, non-transitory, computer-readable media having software encoded thereon, the software when executed by a processor on a particular node at a particular location in a primary directed acyclic graph (DAG) in a computer network configured to:
- receive instructions to initiate a remote stitched (RS)-DAG by the particular node as an RS-DAG root, the instructions indicating one or more properties for the RS-DAG that are different from properties of the primary DAG, wherein the RS-DAG root is a different node in the primary DAG than a root node of the primary DAG;
- initiate the RS-DAG from the RS-DAG root to collect additional data within the RS-DAG regarding a triggering condition, wherein a particular child node of the RS-DAG root in the RS-DAG has a different parent node in the primary DAG; and
- relay messages of the RS-DAG between the RS-DAG root and the root node of the primary DAG that include the collected additional data.

* * * * *

UNITED STATES PATENT AND TRADEMARK OFFICE
CERTIFICATE OF CORRECTION

PATENT NO. : 9,001,669 B2  
APPLICATION NO. : 13/043111  
DATED : April 7, 2015  
INVENTOR(S) : Vasseur et al.

Page 1 of 1

It is certified that error appears in the above-identified patent and that said Letters Patent is hereby corrected as shown below:

In the Specification

In column 12, line 1, please amend as follows:
   such as, e.g., once the RS-DAG 530 is no longer required

In the Claims

In column 14, line 35, please amend as follows:
   12. The method as in claim 1, further comprising:

Signed and Sealed this
Eighth Day of September, 2015

Michelle K. Lee
*Director of the United States Patent and Trademark Office*